July 10, 1928. 1,676,432
F. L. DIETERICH
PACKING MATERIAL AND GASKET MADE THEREFROM
Filed April 10, 1925
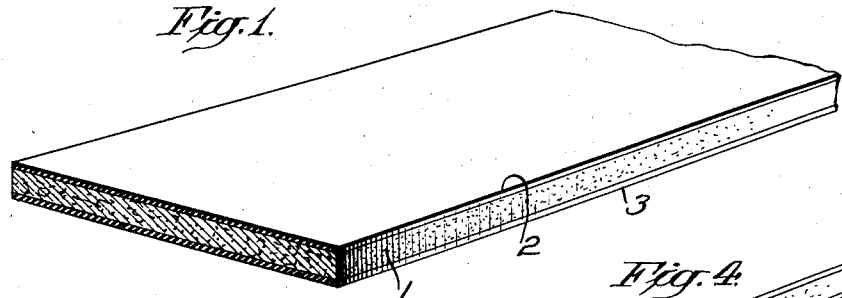
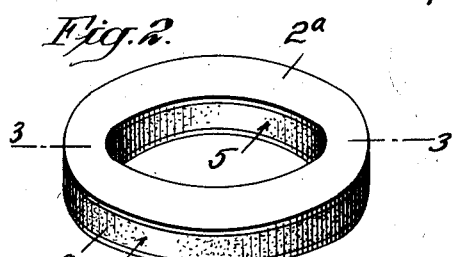
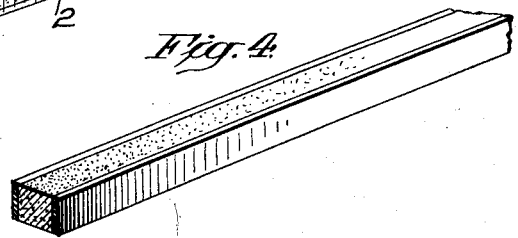
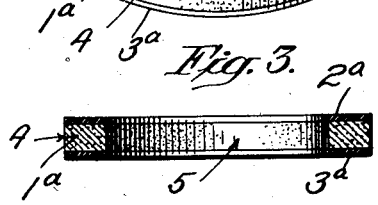
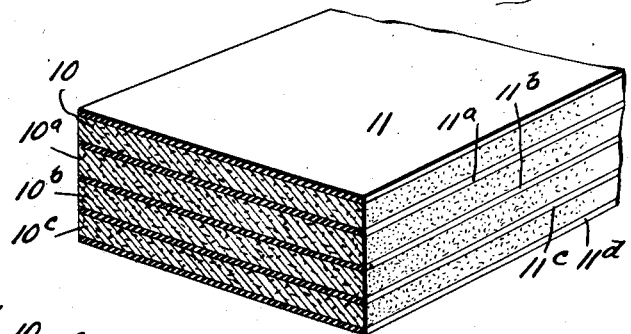
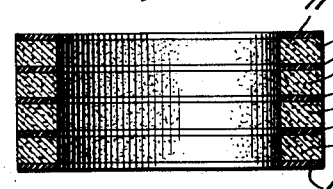
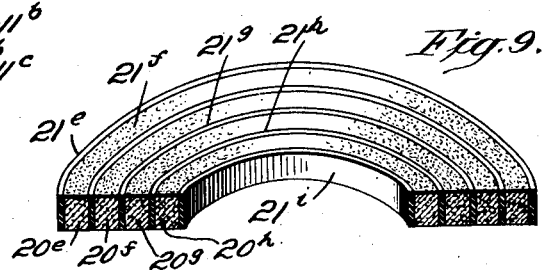
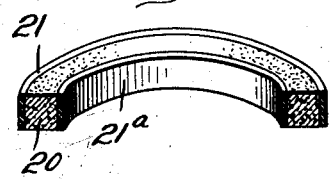
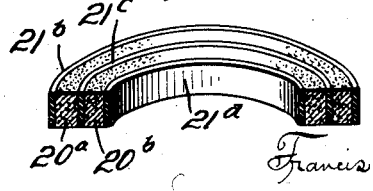
INVENTOR
Francis L. Dieterich
BY
Joseph F. O'Brien
His ATTORNEY Patented July 10, 1928.

1,676,432

UNITED STATES PATENT OFFICE.

FRANCIS L. DIETERICH, OF NEWARK, NEW JERSEY.

PACKING MATERIAL AND GASKET MADE THEREFROM.

Application filed April 10, 1925. Serial No. 22,112.

This invention relates to improvements in packing material and gaskets made therefrom.

One of the objects of my invention is to produce a packing material from which may be made gaskets or like elements which will have elastic properties of high degree, will be readily compressible under pressure and will cause a return to its original shape upon release of the pressure, thus, enabling the sealing of joints and the maintenance thereof in sealed condition.

Another object of my invention is to produce an improved material which will have the desirable properties of great strength, pliability, toughness, long wearing properties and elasticity or resilience of a high degree which will enable it to recover its original shape after repeated compressions.

Another object of my invention is to produce a packing material which will resist the use of oil, water and various other liquids and gases with which it may come in contact in use.

Another object of my invention is to produce gaskets from a laminated material comprising a sheet of cork and preferably granulated cork having layers on opposite sides thereof of a tough and tenacious material such as vulcanized fiber, which are securely glued to the said granulated cork.

Another object of my invention is to produce a gasket composed of continuous flat rings of fiber or other relatively tough material and a sheet of granulated cork arranged between the same.

Another object of my invention is to produce a material in which the strength of the granulated cork is greatly increased, disintegration thereof is prevented and in which the elasticity or spring is likewise greatly increased and held against disintegration during pressure, but otherwise allowed to act to seal and maintain joints in sealed condition.

Another object of my invention is to produce a material which may be used to produce gaskets having either horizontal or vertical laminations in accordance with the character of the elements with which the packing is intended to be used.

With these and other objects in view, the invention comprises the combination of members and arrangement of parts so combined as to co-act and cooperate with each other in the performance of the functions and the accomplishment of the results herein contemplated, and comprises in one of its adaptations the species or preferred form illustrated in the accompanying drawings, in which:—

Fig. 1 is a perspective view of a sheet of laminated material embodying my invention;

Fig. 2 is a perspective view of a gasket stamped out of the material shown in Fig. 1 to provide continuous laminated rings of fiber;

Fig. 3 is a section substantially on the line 3—3 of Fig. 2;

Fig. 4 is a strip of material with vertical laminations which may, if desired, be cut from the sheet material shown in Fig. 1;

Fig. 5 is a perspective view of a sheet material having a series of laminations of cork and fiber;

Fig. 6 is a section of a gasket cut from a laminated sheet such as shown in Fig. 5;

Fig. 7 shows a gasket produced by bending a strip such as shown in Fig. 4; and

Figs. 8 and 9 likewise show gaskets produced by bending a plurality of strips such as shown in Fig. 4.

Referring now to these drawings and particularly to Fig. 1 thereof, I have in said figure illustrated a sheet of packing comprising a centrally disposed section 1 comprising a sheet or plate of cork and preferably of granulated cork. Arranged on opposite sides thereof are plates or sheets 2 and 3 respectively of a relatively tenacious material, preferably comprising vulcanized fiber. The edges of the cork sheet or layers between the flat outer layers are uninclosed and free from fiber so that the layers of tenacious material may be free to act as compression elements through which pressure from an outside source may be applied without substantial retardation on the cork layer, sheet or plate.

By thus first producing this sheet material, I am enabled to stamp out therefrom a gasket A such as shown in Figs. 2 and 3 formed of continuous rings. In said figures $2^a$ represents what I shall term an upper flat compression ring and $3^a$ a lower flat compression ring which enables the cork core $1^a$ to be placed under compression without danger of disintegration and furthermore enables the gasket to be repeatedly compressed and expanded without appreciable loss of volume, this recovery of size and shape of the gasket being instantaneous and without material wear or disintegration. Said compression rings, furthermore, allow a slight expansion during compression of the cork sheet at the outer edge or perimeter 4 and also at the inner annular edge 5. Thus, I provide a gasket on which downward pressure on the flanges 2ª and 3ª not only acts to cause the expansive force of the cork sheet or layer to press upwardly against the compressing element but also to bulge outwardly between the flanges so as more effectively to seal a joint between the side walls of a compartment and the gasket flanges and between a shaft or other element on which the gasket is fitted and such flanges. The said compression elements are preferably composed of fiber, but this sheeting or plating may vary according to the use to which the gasket or packing is to be applied. Any tough or tenacious material, such as rubber, celluloid or metal may be utilized but I have found that vulcanized fiber is especially well adapted for many purposes and suitable for general use.

The cork and the outer layers of tough or tenacious material are firmly adhered together either by cementing or gluing, and in the preferred form I utilize a cement which is resistant to oils, water and common solvents and also has the property of flexibility, such as a glue having a casein base mixed with calcium tannate and glycerine or a glue having a nitro-cellulose base.

A sheet of material made in accordance with my invention is extremely tough and pliable and gaskets cut therefrom are strong, resilient and tough.

The cork sheet or layer compresses and expands indefinitely thereby giving the gasket exceptional properties for sealing joints and keeping them tight regardless of vibration or slight movements in the joint through expansion or contraction. Furthermore, when gaskets of this construction are used on a pipe line, expansion joints may be eliminated because each gasket has the property of expanding and compressing and will thereby take up the expansion and contraction of the pipe length.

By first making a sheet of this material, and then cutting out a gasket therefrom, I am enabled to obtain continuous flat compression rings which enable the cord of granulated cork to be more securely bound than would a non-continuous ring.

It will be seen that I have produced an extremely tough and elastic composite material which constitutes, in effect a resilient cellular-cork spring in the form of a gasket or washer, the strength of which, from an engineering standpoint, would be figured as an I-beam. The outer tough layers of fiber will act similarly to the flanges of an I-beam while the core will act similarly to the web of such a beam, that is to say, the strength of the complete structure is caused to be transferred toward the outer tough layers or flanges while the core of granulated cork which forms the major portion of the composite material transmits stresses toward the outer portion of the packing or gasket and there is thus combined in the composite structure the desirable characteristics of greater strength than is inherent in either of the materials jointly. Also the property of elasticity or resilience which is inherent in the cork is greatly increased by the retention of the same between the tenacious sheets so as to prevent its disintegration, the tough fiber sheets being spaced apart a distance sufficiently small to prevent any rupture at the side edges but to allow, under compression, such side expansion or bulging only as will assist in sealing a joint. I have found that when cork sheets of five times the thickness of one of the fiber sheets are used, no appreciable distortion is apparent after compression and recovery.

Where accuracy of fit is necessary, the slight distortion or bulging at the edges may be avoided by slightly grooving the outer and inner annular edges of the cork sheet.

It is not desirable to utilize cork layers or sheets of relatively great thickness which will space the rings or sheets of tenacious material too far apart and where a thick gasket is required, I preferably utilize a series of layers of sheets of cork laminated with a series of sheets of fiber or like tenacious material. Thus in Figs. 5 and 6 I have shown a packing sheet made up of four sheets 10, 10ª, 10ᵇ and 10ᶜ of cork and five sheets 11, 11ª, 1fᵇ, 11ᶜ and 11ᵈ of fiber.

In Figs. 4, 7, 8 and 9 I have shown a modified form of packing ring in which the laminations are disposed vertically. The packing rings or gaskets shown in Figs. 7, 8 and 9 may be formed by winding a strip such as shown in Fig. 4 about a shaft or mandrel, the strips in this case being treated with glycerine to make them sufficiently soft and pliable.

In Fig. 7, a strip such as shown in Fig. 4, which may be cut off the sheet shown in Fig. 1, is bent or wound to provide a single resilient cork coil or ring 20 with fiber coils 21, 21ª arranged on opposite sides thereof.

In Fig. 8, two such cork rings or coils 20ª 20ᵇ are shown with three coils or rings 21ᵇ, 21ᶜ and 21ᵈ of fiber while in Fig. 9 a series or four coils 20ᵉ, 20ᶠ, 20ᵍ and 20ʰ are laminated with coils 21ᵉ, 21ᶠ, 21ᵍ, 21ʰ and 21ⁱ of fiber. Each of the ring sections in said figures may be formed independently and provided with skive ends which are fastened together, or a series of the ring may constitute a continuous spiral with skived ends suitably fastened to the intermediate portion of the strip.

Having described my invention, I claim—

1. As a new article of manufacture, a sheet packing comprising flat, laminated, adherent sheets of vulcanized fiber arranged on opposite sides of a medially-disposed sheet of granulated cork whereby a composite is provided in which the vulcanized fiber reinforces the structure, resists rupture, prevents disintegration on compression, and guides the expansive force of the cork sheet to seal and to keep a joint tight.

2. As a new article of manufacture, a gasket comprising flat, laminated, adherent and continuous rings of vulcanized fiber arranged on opposite sides of a medially-disposed ring of granulated cork, the surfaces of said continuous rings of vulcanized fiber firmly adhering to the ring of cork whereby a composite is provided in which the vulcanized fiber reinforces the structure, resists rupture, prevents disintegration on compression, and guides the expansive force of the cork to seal and to keep a joint tight.

3. As a new article of manufacture, a sheet packing comprising flat, laminated, adherent sheets of cork and vulcanized fiber, the abutting surfaces of the sheets being firmly adhered together, whereby a flexible and resilient composite is provided which reinforces the structure, resists rupture, prevents disintegration on compression and guides the expansive force of the cork to seal and keep a joint tight.

4. As a new article of manufacture, a sheet packing comprising flat, laminated, adherent sheets of cork and vulcanized fiber, the adherent sheets of one of such materials being disposed medially and the sheets of the other material being arranged on opposite sides thereof, and the abutting surfaces of the sheets being firmly adhered together, whereby a flexible and resilient composite is provided which reinforces the structure, resists rupture, prevents disintegration on compression and guides the expansive force of the cork to seal and keep a joint tight.

In witness whereof, I have signed my name to the foregoing specification.

FRANCIS L. DIETERICH.